O. POTTER.

CABLE HAULING ENGINE.

APPLICATION FILED JAN. 22, 1912.

Reissued Mar. 25, 1913.

13,546.

3 SHEETS—SHEET 1.

WITNESSES:

T. E. Matheny

J. E. Bonnell.

INVENTOR

Orlin Potter

BY Pierce Barnes

ATTORNEY

COLUMBIA PLANOGRAPH CO., WASHINGTON, D. C.

O. POTTER.
CABLE HAULING ENGINE.
APPLICATION FILED JAN. 22, 1912.
Reissued Mar. 25, 1913.
13,546.
3 SHEETS—SHEET 2.
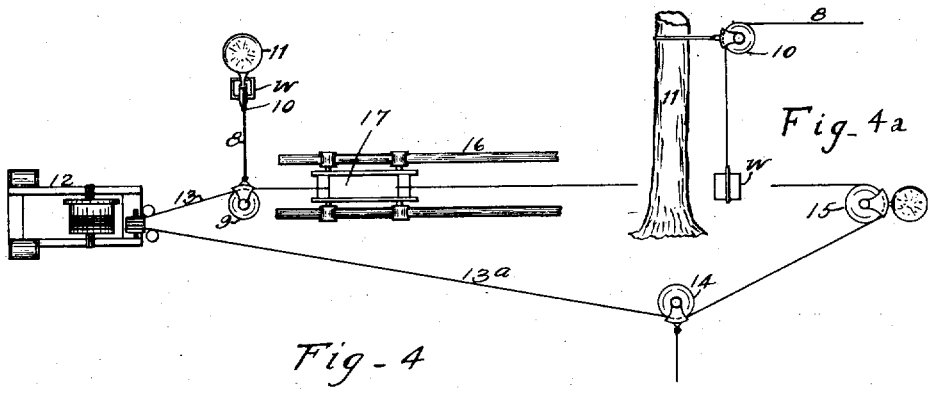
Fig. 4a
Fig. 4
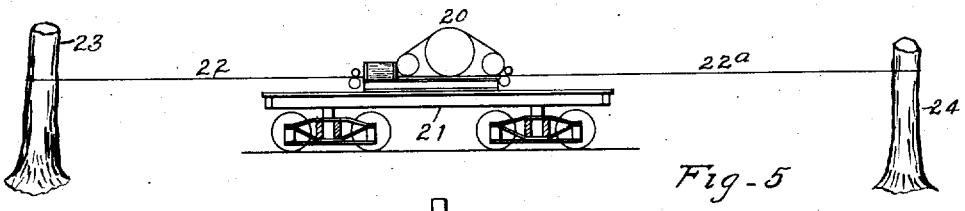
Fig. 5
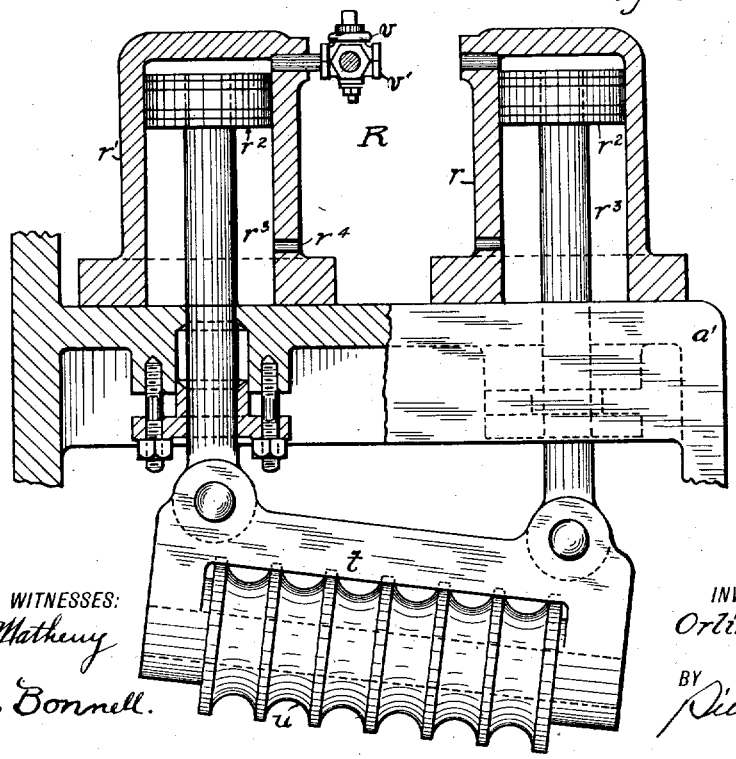
Fig. 6
WITNESSES:
F. C. Matheny
J. E. Bonnell.
INVENTOR
Orlin Potter
BY
Pierce Barnes
ATTORNEY
COLUMBIA PLANOGRAPH CO., WASHINGTON, D. C.

O. POTTER.

CABLE HAULING ENGINE.

APPLICATION FILED JAN. 22, 1912.

Reissued Mar. 25, 1913.

13,546.

3 SHEETS—SHEET 3.

WITNESSES:

F. C. Matheny

J. E. Bonnell.

INVENTOR

Orlin Potter

BY Pierce Barnes

ATTORNEY

COLUMBIA PLANOGRAPH CO., WASHINGTON, D. C.

UNITED STATES PATENT OFFICE.

ORLIN POTTER, OF PORTLAND, OREGON.

CABLE-HAULING ENGINE.

13,546. Specification of Reissued Letters Patent. Reissued Mar. 25, 1913.

Original No. 955,283, dated April 19, 1910, Serial No. 451,890. Application for reissue filed January 22, 1912. Serial No. 672,788.

*To all whom it may concern:*

Be it known that I, ORLIN POTTER, a citizen of the United States, residing at Portland, in the county of Multnomah and State of Oregon, have invented new and useful Improvements in Cable-Hauling Engines, of which the following is a specification.

This invention relates to that class of engines commonly called "donkeys", and used in logging camps, mines, etc., for hauling a cable to and fro and thereby moving cars or other loads; and my invention has for its object to combine with engines of the type referred to, simple means whereby the hauling of the load is placed under more efficient control than heretofore, so as to render the hauling operation as nearly absolutely safe as possible.

I attain my object by providing the cables of the engine drum with a grooved-face periphery, and combining therewith auxiliary drums, also grooved-face, and coöperating devices whereby the cable is prevented from slipping, and the hauling operation is made both safe and convenient, all as hereinafter more fully explained.

Figure 1:
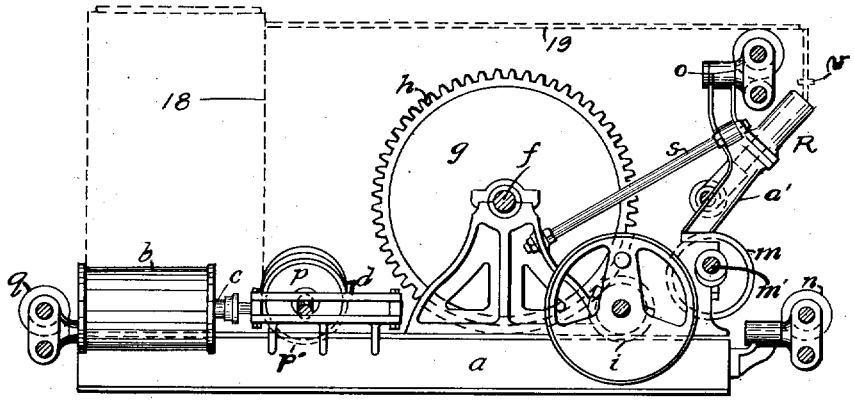
Figure 2:
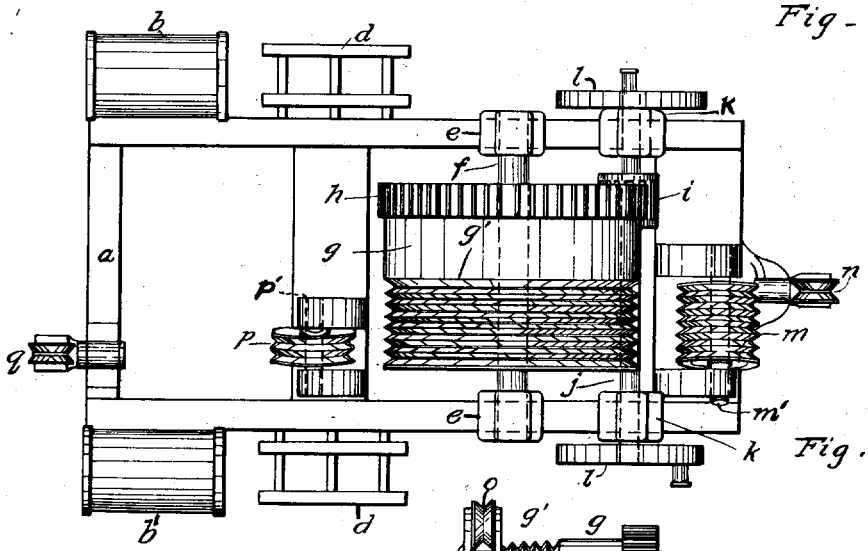
Figure 3:
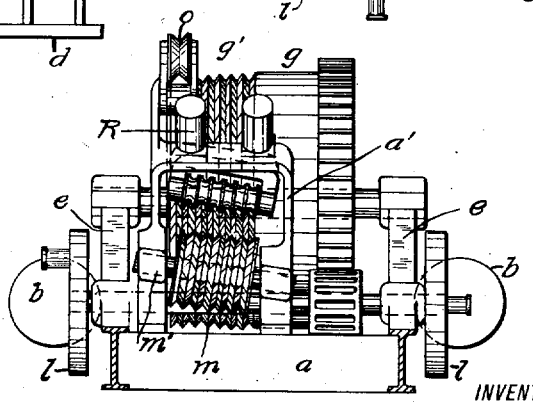
Figure 7:
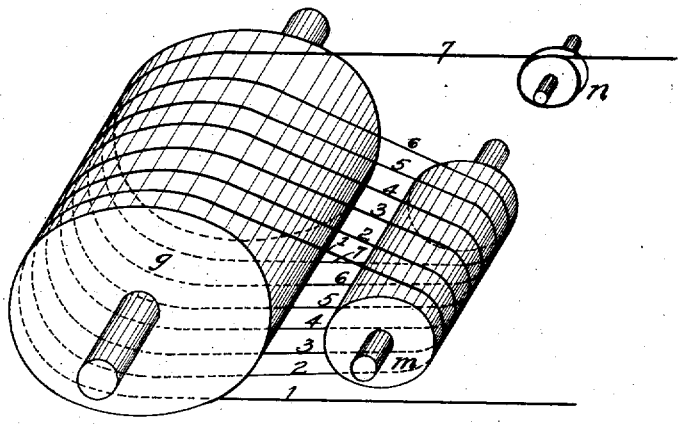
Figure 8:
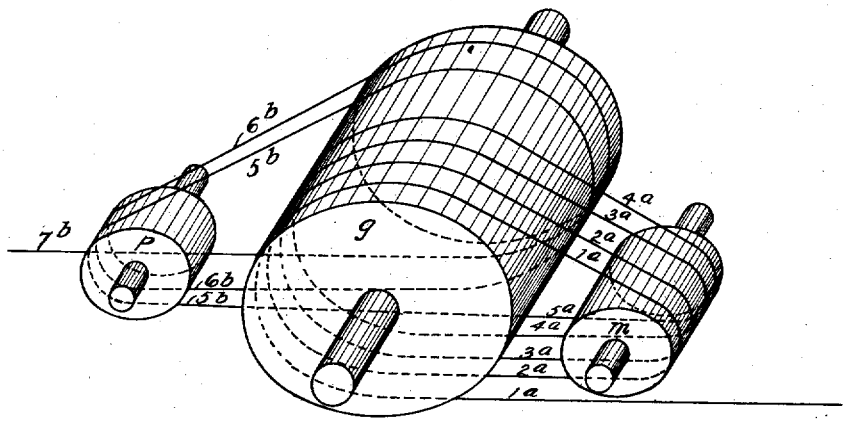

In the drawings, Figure 1 shows a partial side elevation of a "donkey" engine embodying my invention. Fig. 2 is a partial plan or a top view, agreeing with the preceding figure; Fig. 3 is a corresponding right-end view of my engine; Fig. 4 is a diagrammatic illustration of my invention as applied in practice for the hauling of a car over a pole-road; Fig. 4[a] is a pictorial view of a detail of the embodiment of my invention illustrated in Fig. 4; Fig. 5 is a diagrammatic illustration showing my engine as mounted upon a platform car, and the hauling cable arranged to run the car back and forth between two points; Fig. 6 is a sectional detail of the steam tightener-device, combined with my engine and adapted to be thrown into service as the occasion presents itself; Fig. 7 is a diagrammatic illustration showing the cable wound around the grooved-face auxiliary drum of an engine, installed as shown for example in Fig. 4; and Fig. 8 is a diagrammatic illustration showing the cable wind as arranged in my engine when placed on a flat car, and to be operated as illustrated in Fig. 5.

The characters designate the parts referred to.

I deem it convenient to build all my engines after the same type or pattern illustrated in Figs. 1, 2 and 3, whether the same is to be used in practice, as illustrated in the diagrammatic view Fig. 4, or as shown in Fig. 5. The supporting frame *a* may be made of any suitable material. On it are mounted cylinders *b*, in which operate pistons *c*, the crossheads of which slide in guideways *d*, as usual. Some of the parts referred to have been omitted from Fig. 2 for the sake of brevity and clearness; and some of the well known devices of the engine are omitted in all views. At one end of the frame are mounted pillow blocks *e*, on which is journaled a shaft *f*, on which is mounted a driven drum *g*, the peripheral face of which is provided with a series of grooves *g'*, which is shown in Fig. 2, comprise seven in number. On the far side of the drum *g*, as shown in Fig. 2, is mounted a gear wheel *h*, meshing with a pinion *i*, fastened on a shaft *j*, journaled in bearings *k*. The gear wheel *h* is bolted to the drum *g*, and both are rigid on their common shaft *f*. The space intermediate the grooved periphery of the drum *g* and the gear-wheel *h* is provided to apply a strap-brake (not shown) of the common type. The connecting rods of the pistons are coupled to the wrist pins of the crank disks *l*, as usual. In front of the drum *g* there is journaled on the frame *a* an auxiliary drum *m*, also provided on its periphery with a series of grooves, corresponding in arrangement with the grooves of the drum *g*.

As is shown in Fig. 3, the shaft *m'* of the auxiliary drum *m* is alined at an oblique angle from the horizontal, which alinement, as apparent, is required to properly lead the cable-end between the main and the auxiliary drums. In front of the auxiliary drum $m$ is provided a fair-leader $n$ alined with the lower face of the main or driven drum $g$ and there is further provided a second fair-leader $o$, located above the top of the drum $g$, as convenient to properly lead the return end of the hauling cable which is led toward the upper end of the drum $g$. The fair-leaders $n$, $o$, are of usual construction. The upper fair-leader $o$ is not shown in Fig. 2. To the rearward of the main drum $g$ is provided a grooved-face pulley $p$, the shaft $p'$ of which is also alined at an oblique angle, for the same purpose as described concerning the shaft $m'$ of the auxiliary drum $m$. The periphery of the grooved-face pulley $p$ is provided with two grooves. The purpose of the grooved-face pulley $p$ is to enable one to so arrange the hauling cable that one end thereof will run rearward from the main drum $g$, and pull from the lower face of said main drum $g$. Rearward of the grooved-face pulley $p$, I provide a fair-leader $q$. To prevent the slipping of the cable wound around the drums from any cause, I have provided a tightener mounted on an extension of the frame $a'$, and braced by rods S as shown in Fig. 1. The construction and operation of said tightener R are readily seen by having reference to the enlarged sectional detail thereof, shown in Fig. 6.

$r$ and $r'$ represent two cylinders in which are pistons $r^2$, the outer ends of the rods $r^3$ of which pistons are connected to a yoke-like bearing $t$, in which is journaled a grooved-face drum $u$. The grooves of the latter correspond with those of the auxiliary drum. Both cylinders of the tightener R are connected with the boiler of the engine, and their respective steam pipes are provided with suitable valves $v$, so as to enable the control of the admission of steam into either cylinder. The tightener is so mounted as to position the grooves in the drum $u$ in correspondence with those of the drums; that is to say, so that all the cable strands lying in the grooves of the auxiliary drum $m$ will be provided with corresponding grooves in the drum of the tightener R. Since, obviously, the strain on the hauling cable will always come on one or the other end of the grooved-face drum, the circumstances being controlled by the direction in which the engine is operating, it is also necessary to so arrange the tightener as to enable the same to be applied on that particular section or end of the hauling cable which for the time being is receiving the greatest strain. To this end, I have so contrived my tightener that either one of the pistons $r^2$ may be moved forward and thus permit either end of the tightener drum to be brought to bear upon a particular end strand of the cable wind. The air entering on the under side of the pistons $r^2$ escapes through ducts $r^4$.

Each of the pipes conducting the steam to the posts at the upper ends of the cylinders $r$, $r'$ is provided with a valve $v$. The valve $v$ is arranged to enable its adjustment to admit steam into the cylinders $r$, $r'$ and also to permit the admitted steam to escape at $v'$, into the air, when the tightener is to be released. The pistons $r^2$ are moved back to their normal position, by the reflex of the cable-strands against which the tightener has been thrown.

The arrangement of the winding cable around the drums of course depends upon the mode in which my engine is to be used. Supposing the use of my engine to be as diagrammatically illustrated in Fig. 4, the cable would be led first around the under side of the main drum $g$, thence around and over the latter and over the top of the auxiliary drum $m$, thence around the under side of the latter and back around the main drum $g$ a number of times as designated by the numbers 1 to 7; and finally the cable end 7 would be led over the fair-leader toward the object with which that cable end is to be connected. The first described arrangement of the cable is illustrated in Fig. 7. If, however, my engine is to be used in practice as illustrated diagrammatically in Fig. 5, then the winding of the cable must be arranged as illustrated in Fig. 8; that is to say, the cable-end $1^a$ is passed around the under side of the main drum $g$, thence up and around the same, over the top and around the auxiliary drum $m$; thence around the two drums on lines $2^a$, $3^a$, $4^a$; thence on line $5^a$, and across the under side of the main drum $g$, to the grooved-face pulley $p$, thence across the under face of and around the last mentioned pulley, back on line $5^b$ to the upper face of the main drum $g$; thence around the drum $g$, and pulley $p$, on line $6^b$; and thence around the drum $g$ and rearward across the under face of the main drum and the pulley on line $7^b$ to the point where attached. The purpose of the cable arrangement illustrated on Fig. 8 is to bring both ends of the table in position to start to wind on and off the under face of the main drum $g$.

In the diagrammatic view, Fig. 4, 12 represents my engine, 13, $13^a$ the two ends of the hauling cable; 14 and 15 are guide pulley blocks; 16 is a pole track, and 17 is a car to which the ends of the cable are attached; 8 is a cable provided with a pulley 9 over which the cable end 13 runs. The far end of the cable 8 runs over a pulley 10 secured to a post 11, and from said end is suspended a weight $w$, by which arrangement the cable-end 13 is kept taut. The last mentioned features are illustrated in Fig. 4ª.

The diagrammatic view Fig. 5 represents my engine 20, as mounted on the flat car 21, and the opposite ends of the cable 22 and 22ª are fastened to posts 23 and 24; the latter representing distant objective points between which the car 21, is caused to travel by operating my engine 20, and the cable ends being arranged as diagrammatically illustrated in Fig. 8. The outlines 18 and 19 represent the boiler and steam pipe connection therefrom to the valve *v*.

The parts not specifically described are understood to be of common construction and arrangement.

My invention is especially suitable for hauling on a steep grade.

I claim:—

1. The combination in a hauling engine of a grooved-face main or driven drum, a corresponding grooved-face auxiliary drum journaled in front of one face of said driven drum, fair-leaders arranged relatively to the front face of said driven drum and said auxiliary drum, a tightener operated by the driving motive-force and consisting of a rockable bearing, a grooved drum journaled therein and positioned relatively to the cable-strands running between the driven-drum and its auxiliary drum, and connections whereby the motive force may be applied to cause either end of said tightener drum to bear upon said cable strands.

2. The combination in a hauling engine of a grooved-face main or driven drum, a corresponding grooved-face auxiliary drum journaled in front of one face of said driven drum, fair-leaders arranged relatively to the front face of said driven drum and said auxiliary drum, a grooved-face pulley journaled in front of the rear or opposite face of said driven drum, a fair-leader arranged relatively to said grooved-face pulley, a tightener operated by the driving motive force and consisting of rockable bearings, a grooved drum journaled therein and positioned relatively to the cable-strands running between the driven-drum and its auxiliary drum, and connections whereby the motive-force may be applied to cause either end of said tightener drum to bear upon said cable strands.

3. The combination in a hauling engine of a grooved-face main or driven drum, a corresponding grooved-face auxiliary drum journaled on a relative oblique axis in front of one face of said driven drum, fair-leaders arranged relatively to the front face of said driven-drum and said auxiliary drum, a grooved-face pulley journaled on a relative oblique axis in front of the rear or opposite face of said driven drum, a fair-leader arranged relatively to said grooved-face pulley, a tightener operated by the driven motive-force, consisting of a rockable bearing, a grooved-face drum journaled therein and positioned relatively to the cable-strands running between the driven-drum and its auxiliary drum, and connections whereby the motive-force may be applied to cause either end of said tightener drum to bear upon said cable strands.

4. In a hauling engine, a grooved-face main or driven drum, a grooved-face auxiliary drum journaled in front of one face of said driven drum, a grooved-face pulley journaled in front of the opposite face of said driven drum, said auxiliary drum and said pulley being idlers, a cable arranged to pass under the auxiliary drum to the under face of the driven drum, thence having several laps around the driven and auxiliary drums, thence passing from the under face of auxiliary drum to the grooved-face pulley, thence having several laps around said pulley and said driven drum, and finally passing from the under side of the driven drum.

5. In a hauling engine, a grooved-face main or driven drum, a grooved-face auxiliary drum journaled in front of one face of said driven drum, a grooved-face pulley journaled in front of the opposite face of said driven drum, said auxiliary drum and said pulley being idlers, a cable arranged to lead to the driven drum, thence having several laps around the driven and auxiliary drums, thence passing from the auxiliary drum to the pulley, thence having several laps around said pulley and said driven drum, and finally passing from the driven drum.

6. In a hauling engine, the combination with a driven drum, an auxiliary drum, and a pulley, said auxiliary drum and pulley being idlers, of a cable leading to the driven drum, thence having several laps about the driven and auxiliary drums, thence having several laps about the driven drum and the pulley, and passing from the driven drum.

7. In a hauling engine, a main or driven drum, an auxiliary drum journaled in front of one face of said driven drum, a pulley journaled in front of the opposite face of said driven drum, said auxiliary drum and said pulley being idlers, and a cable having several contiguous laps about said driven drum and said auxiliary drum, and thence having several contiguous laps about said driven drum and said pulley.

8. In a hauling engine, a grooved-face main or driven drum, a corresponding grooved-face auxiliary drum journaled on a relative inclined axis in front of one face of said driven drum, a grooved-face pulley journaled on a relative inclined axis in front of the opposite face of said driven drum, said auxiliary drum and said pulley being idlers, and a cable having several laps about said driven drum and said auxiliary drum, and thence having several laps about said driven drum and said pulley.

9. In a hauling engine, a driven drum, an auxiliary drum and a pulley, a cable leading to the driven drum and thence having one or more laps about the driven drum and auxiliary drum, thence having one or more laps about the driven drum and the pulley, passing from the driven drum.

ORLIN POTTER.

Witnesses:

HORACE BARNES,

E. PETERSON.

Copies of this patent may be obtained for five cents each, by addressing the "Commissioner of Patents, Washington, D. C."